United States Patent [19]
Shimizu

[11] 3,730,988
[45] May 1, 1973

[54] ELECTRONIC TRANSMISSION SYSTEM OF STATIC PICTURE WRITINGS

[75] Inventor: Takehiro Shimizu, Setagayaku, Japan

[73] Assignee: Pioneer Electronic Corporation, Tokyo, Japan

[22] Filed: July 29, 1970

[21] Appl. No.: 167,423

[30] Foreign Application Priority Data

July 29, 1970 Japan ................................45/66378

[52] U.S. Cl. ................................178/6.8, 178/DIG. 3
[51] Int. Cl. ................................H04n 7/12
[58] Field of Search ................................178/DIG. 3, 6.8

[56] References Cited

UNITED STATES PATENTS 3,428,744 2/1969 Green et al. ....................178/DIG. 3
3,215,773 11/1965 Chatten et al. ....................178/DIG. 3
3,436,474 4/1969 Saeger et al. ....................178/DIG. 3
3,128,338 4/1964 Teacher ....................178/DIG. 3

*Primary Examiner*—Benedict V. Safourek
*Assistant Examiner*—Joseph A. Orsino, Jr.
*Attorney*—Richard C. Sughrue et al.

[57] ABSTRACT

The time required to electronically transmit the contents of a document, such as a picture or a printed paper, is markedly reduced. The document is divided into minute squares and each square is scanned by a preliminary scan for detecting the presence or absence of useful information. The preliminary scan is much more rapid than the regular scan used for forming a transmittable document image. Only those squares having useful information are scanned by the regular scan to form images which are transmitted. Sync pulses and shift pulses are transmitted along with the image signals to allow the receiver to properly position the image signals in generating a reproduction of the document.

3 Claims, 4 Drawing Figures

INVENTOR

BY

ATTORNEY

INVENTOR

BY

ATTORNEY

INVENTOR
BY
ATTORNEY

ELECTRONIC TRANSMISSION SYSTEM OF STATIC PICTURE WRITINGS

BACKGROUND OF THE INVENTION

1. Field of the Invention

This invention relates to an electronic transmission system, and more particularly to an electronic transmission system of static pictures or writings.

2. Description of the Prior Art

Prior art electronic transmission systems for electronically transmitting documents, such as static pictures or writings, require a time for transmission which is proportional to the area of the document rather than being proportional to the content of useful information on the document. Therefore, the efficiency of transmission is not high.

If one considers a document which is typed or printed, about 80 percent of the document is made up of blank spaces. This would be the case, for example, of a typed document in which the print size is about 3 millimeters square, a 1 millimeter space is between adjacent typed characters, a 3 millimeter interval is between adjacent lines, and about 10 percent of the paper is a blank border surrounding the typed portion of the document.

SUMMARY OF THE INVENTION

It is therefore the main object of the present invention to provide a novel and improved electronic transmission system of static pictures or writings in which a time required for transmission is efficiently contracted.

Other objects and advantages of the present invention will further become apparent hereinafter and from the drawings.

DESCRIPTION OF THE PREFERRED EMBODIMENT

Figure 1:
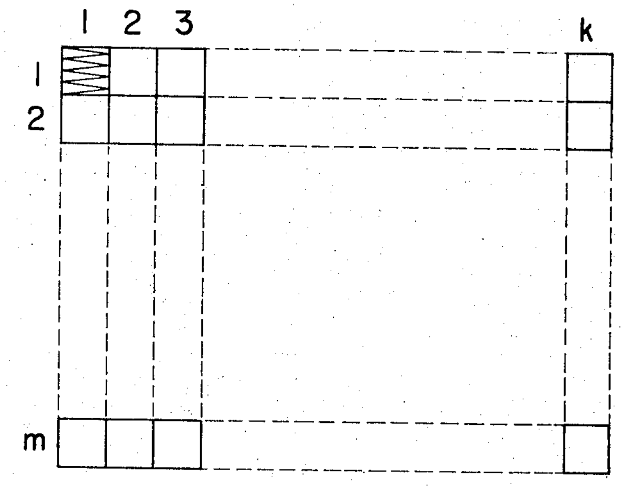
FIG. 1 shows a document, such as a picture or a writing, which is divided into many minute squares in accordance with the present invention.

In FIG. 1, a paper for a picture or a writing is equally divided into "k" sections horizontally and "m" sections vertically to provide many minute squares. Each minute square is scanned in order, and for any given square having no useful information therein, i.e., blank square, no information signal need be transmitted. Considering the above example where 80 percent of the document is blank space, and further assuming it only takes one-tenth the normal scanning time to determine if a square is blank, the total transmission time for the document can be reduced from 100 percent (representing the time needed for prior art methods) to 28 percent (20 percent for the 20 percent of the squares having information content and 8 percent for the time required to determine that 80 percent of the squares are blank).

In a case where the lower half of the paper is blank, the transmitting time for the upper half is 14 percent and for the lower half is 50 over 10 percent, that is 5 percent. Consequently, the total transmitting time is substantially contracted to 19 percent.

The present invention will be further explained in detail referring to FIG. 1 wherein a space of a picture or a writing is equally divided into "k" sections horizontally and "m" sections vertically to get many minute squares. The sequence of operation is as follows:

a. The first square of the first line is initially scanned horizontally and vertically by a preliminary scan, so as to discriminate whether any information is contained in the square.

b. In a case where there is some information in the square, the square is regularly scanned, and a synchronizing pulse and image signal are transmitted together. On the other hand, where there is no information in the square, the regular scanning of the square is omitted and the next operation (c) is begun.

c. A shifting pulse is sent out in order to shift the scanning operation from the first square to the second square.

d. Abovementioned operations (a), (b) and (c) are performed for the second square, and operations are shifted in order, as far as the last "k" square of the first line. After the "k" square, a line shifting pulse is sent out to shift the above-mentioned operations from the first line to the second line. These operations are performed over and over again in relation to each line. After the last line "m," the transmitting operation is stopped.

Figure 2:
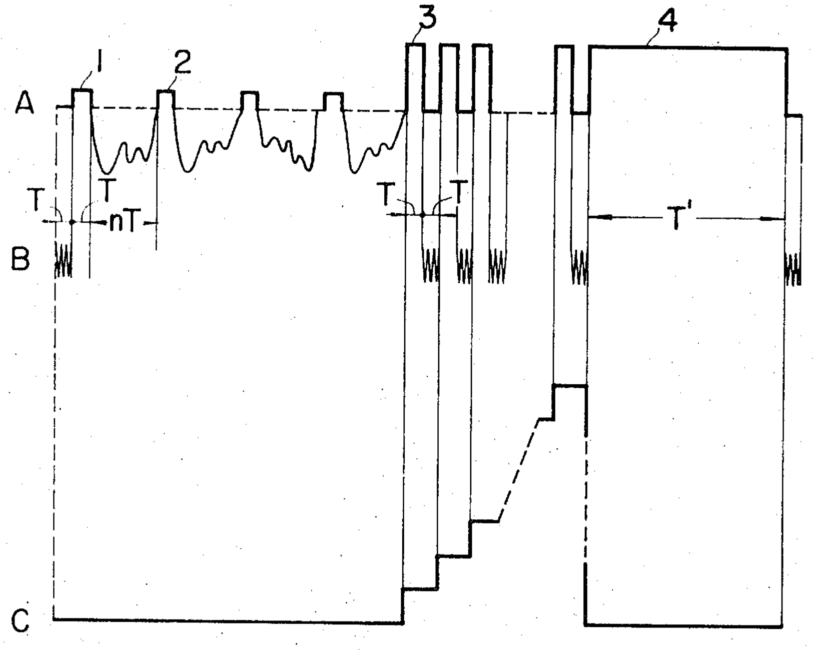
FIG. 2 illustrates an example of a wave form signal which is transmitted in accordance with the present invention.

FIG. 2 illustrates an example of a wave form signal which is transmitted in accordance with the aforementioned operations (a), (b), (c) and (d). Wave form A represents the transmitted wave form for a single line of minute squares, wave form B illustrates the preliminary scans, and wave form C illustrates the output of a D-A convertor. Wave form C will be more apparent later in connection with the description of FIG. 3.

It is assumed that both the preliminary scan and regular scan have four horizontal scan lines per minute square, although the invention is not intended to be limited thereto. The preliminary scan occupies a period T, e.g., 200 micro sec., as illustrated. The minimum pulse width T, is determined by the characteristics of the transmission medium, e.g., a telephone line. If the square contains useful information, the regular scan will take place. For the illustration shown in wave form A, it is assumed that the first square contains useful information. After the preliminary scan, a horizontal sync pulse 1 of width T is transmitted followed by the image 2 of the first horizontal line scan of the first square. This is followed by the successive horizontal sync pulses and line images of the regular scan of the first square. As can be seen, the regular scan is much more time consuming than the preliminary scan.

After the regular scan, an end-of-square shift pulse 3, of width T, is transmitted. This is followed by a preliminary scan of the next square. If no useful information is detected during the preliminary scan, the next end-of-square shift pulse is transmitted immediately following the termination of the preliminary scan. When the last square in a line of squares has been preliminarily scanned (and regularly scanned if it contains useful information), an end-of-line shift pulse 4 of relatively long duration, T′, is transmitted. These operations are shifted in order, as far as the last line "m." After the last line "m" is scanned, the transmitting operation is finished. The preliminary scanning is performed in the transmitter having no relation with the transmitting circuit, so that no signals are sent out from the transmitter.

The signals being sent out to the transmitting circuit are an image signal, a synchronizing pulse, a shifting pulse for shifting the scanning operation from one square to the next square, and a shifting pulse for shifting the scanning operation from one line to the next line. The image signal is given opposite polarity with the other three kinds of pulses so as to ease the detection of the signal in the receiver. The combination of these signals and pulses is not to be confined to any strict conformity with the above description, but may be changed or modified so long as such changes or modifications make no difference from the point of the present invention.

The shifting pulse for squares and the shifting pulse for lines decide the position and the frame of a picture or a writing, fundamentally. Each kind of shifting pulse is chosen to be large in amplitude relative to the synchronizing pulses so that the two kinds of pulses may be easily separated. The end-of-square shift pulses, 3, are distinguishable from the end-of-line shift pulses, 4, by their respective widths T and T′.

In the aforementioned embodiment, only one transmitting cable is employed, but in the case where two transmitting cables are employed, the synchronizing pulse and the image signal may be sent through one transmitting cable and the two kinds of shifting pulses may be sent through the other. Also, the width of the synchronizing pulse and of the shifting pulse for shifting the scanning operation from one square to the next square are chosen in "T," but each width may be chosen in any value. Judging from the point of view that it is desirable to decrease the overall transmission time, it is advisable to choose the width "T," the shortest width allowable by the transmission medium. The larger the minute square is, the smaller the ratio of blank squares against all squares becomes. Therefore, the reduction of transmitting time, owing to the omission of scanning, will not be as great for larger area squares. On the other hand, the smaller the minute square is, the larger the ratio of blank squares against all squares becomes. However, the number of shifting pulses for squares increases in inverse proportion to the size of the square, and an increase in shift pulses tends to increase the transmission time. The optimum size of the minute square is from 0.5 millimeter to 1.5 millimeters.

Figure 3:
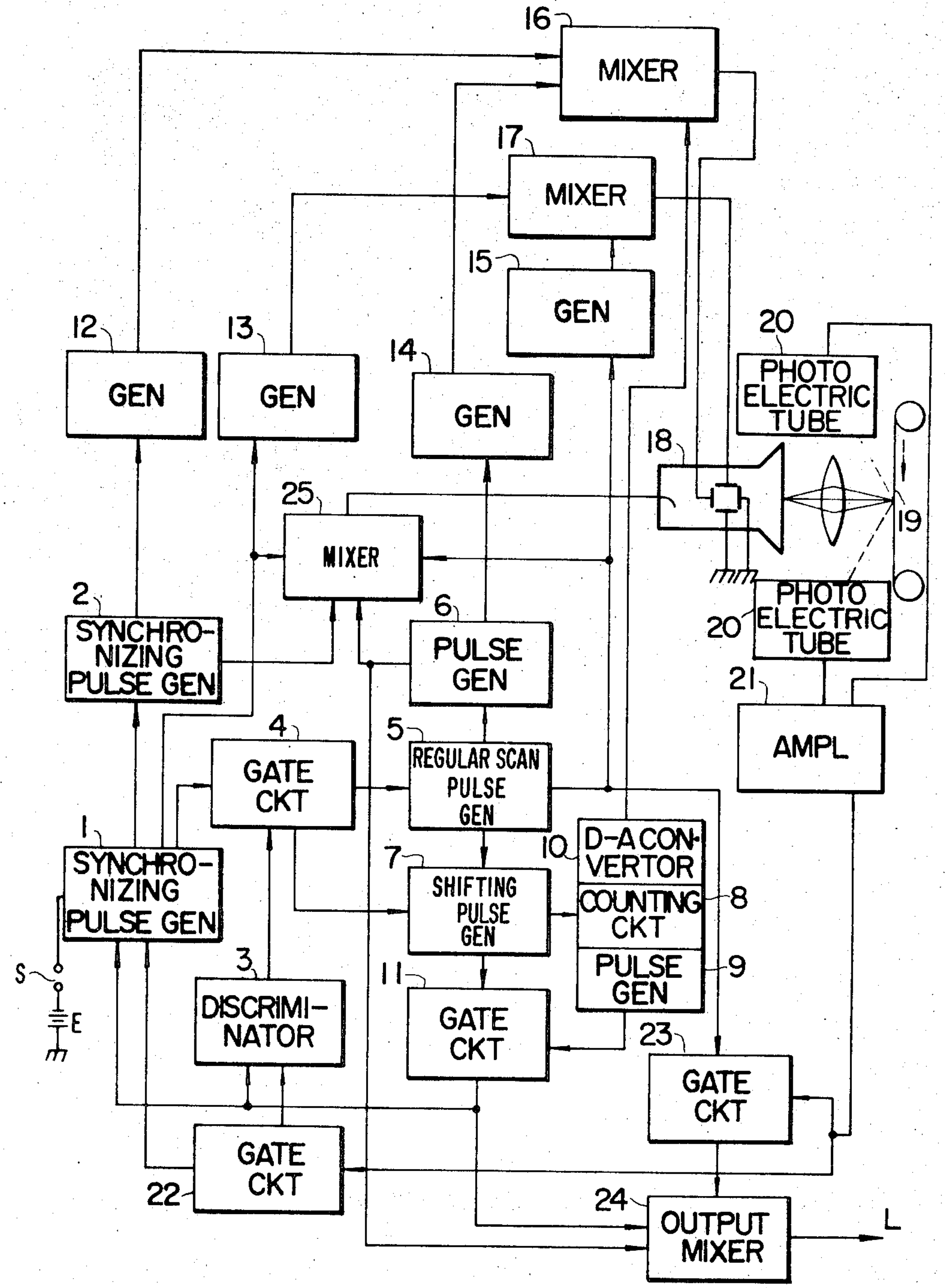
FIG. 3 is a circuit diagram of one embodiment of the transmitter of the present invention.

Hereafter, the transmitting device of the preferred embodiment of the present invention will be explained in detail referring to FIG. 3. The operation of the device begins with the preliminary scanning for the static picture or writing. A synchronizing pulse generator 1 for preliminary vertical scanning (the pulse width is "T") has a voltage E applied thereto through a switch S for the purpose of preventing the generation of pulses. When the switch S is opened to start the operation of the device, the synchronizing pulse generator 1 begins its operation and generates one pulse having a pulse width "T." Simultaneously with the operation of the synchronizing pulse generator 1 for vertical scanning, a synchronizing pulse generator 2 for horizontal scanning which is connected thereto begins its operation (its pulse repetition interval is T/n). The synchronizing pulse generator 2 is controlled by the synchronizing pulse generator 1 and generates horizontal synchronizing pulses during the period "T" of the pulse width of the synchronizing pulse generator 1. Thereby, the synchronizing pulse generator 2 stops its generating operation after generating "n" pulses which are necessary for preliminary horizontal scanning.

The synchronizing pulse generator 2 operates a generator 12 for horizontal scanning signals with its output signals. The synchronizing pulse generator 1 operates a generator 13 for vertical scanning signals with its output signals. Thus, these horizontal and vertical scanning signals are fed to a deflecting portion of a photoelectric converting device 18, for example, a cathode ray tube (hereinafter called "CRT") of a flying spot scanner, through mixers 16 and 17. Rays of the brightening spot of the CRT 18 lights up the first minute square of a picture 19. The reflected light coming from the square is detected by photoelectric tube 20. The output signal of the photoelectric tube 20 is fed into a discriminator 3 through an amplifier 21 and a gate circuit 22. The output of the discriminator 3 is applied to a gate circuit 4.

The synchronizing pulse output from generator 1 is fed through the gate 4 to either pulse generator 5 or pulse generator 7. The diversion of the pulse to either generator 5 or 7 is under control of the signal from discriminator 3. If the signal from discriminator 3 indicates the existence of useful information in the minute square just scanned, the pulse from generator 1 is applied to generator 5 to begin a regular scan of said minute square. Otherwise, the pulse from generator 1 is applied to generator 7.

The pulse generator 5 for regular vertical scanning starts its operation at the end of the pulse (at the fall time) of the synchronizing pulse generator 1 for vertical scanning and generates a pulse which has a width equivalent to the regular vertical scanning period. A pulse generator 6 for regular horizontal scanning, which is connected to the pulse generator 5, starts its operation in time with the rise time of the pulse generated by the pulse generator 5 and generates a horizontal synchronizing pulse having width "T" and a pulse repetition period equal to the regular horizontal line scanning time pulse T. The pulse generator 6 oscillates repeatedly "n" times, where *n* equals the number of scan lines per minute square, and stops its operation at the same time with the end of the vertical pulse generated by the pulse generator 5.

A generator 15 for regular vertical scanning signal is operated by the output pulse of the pulse generator 5, and its output signal is fed into the vertical deflecting portion of the photoelectric converting device 18 through the mixer 17. A generator 14 for regular horizontal scanning signal is operated by the output pulse of the pulse generator 6, and its output signal is fed into the horizontal deflecting portion of the photoelectric converting device 18 through mixer 16.

Where the regular scanning is performed as described above, the image signal of the first minute square, which appears at the output of the photoelectric tube 20, is fed into an output mixer 24 through the amplifier 21 and a gate circuit 23, and sent out to a transmitting line L. The gate circuit 23 is gated on by the pulse which is generated by the pulse generator 5. Therefore, only image signals formed during the regular scanning period are passed to output line L.

After the regular scanning, the pulse generated by the pulse generator 5 is fed to a shifting pulse generator 7 which shifts the scanning operation from one square to the next square. The shifting pulse generator 7 begins its operation at the end of (at the fall time of) the pulse which is generated by the pulse generator 5. It will be recalled that shift pulse generator 7 also receives an input pulse from generator 1 via gate 4 when no useful information is contained in the scanned square. Consequently, when no useful information is in the square, the regular scanning operation is bypassed and the shift pulse generator 7 is energized at the end of the preliminary scan. On the other hand, when there is useful information in the square, the shift pulse generator 7 is not energized until termination of the regular scan.

The shifting pulse of the shifting pulse generator 7 is fed into a counting circuit 8 to be counted. The current in counter 8 is converted by a D-A convertor 10 into the step wave form, as shown in FIG. 2(c). The step wave form is fed into the horizontal deflecting portion of the photoelectric converting device 18 through the mixer 16 thereby shifting the brightening spot of the CRT from the first minute square to the second one.

The shifting pulse of the shifting pulse generator 7 is also applied to the synchronizing pulse generator 1 through a gate circuit 11. The trailing edge of the shift pulse triggers the generator 1 to initiate the preliminary scan of the next minute square. The second minute square is scanned in the same manner, followed by the third minute square, etc. Thus, each square of the first line is scanned in order. After the last square "k" of the first line is scanned, the counting circuit 8 contains a count equivalent to "K." When this occurs, a pulse generator 9 is energized, counter 8 restores to its original state, D-A convertor 10 restores to its original state, and the brightening spot of CRT is shifted to the first minute square of the next line. In the shifting period of the line, the picture is moved mechanically to the width of the first line. The "K" count in counter 8 may be detected by any well known means, such as a decoder which responds only to a count of 8 and is connected to the output lines of the counter. Also, it should be understood that the paper 19 may be shifted by any suitable means following a scan of each complete line of minute squares.

The shifting pulses of the shifting pulse generator 7 and of the pulse generator 9 are sent to the output mixer 24 through the gate circuit 11. At the same time, the synchronizing pulse for regular horizontal scanning is also sent to the output mixer 24. The output signal of the output mixer 24 is sent out to the transmitting line as a transmitting signal. Thus, each line is scanned in order. After the last line "m" is scanned, if the switch S is closed, the synchronizing pulse generator 1 is stopped. Thereby, the operation of whole parts of the embodiment is stopped and the transmission is finished.

Before each successive preliminary scan, the discriminator 3 is reset by the pulse from the shifting pulse generator 7 so as to prepare it for the next new input signal. A mixer 25 mixes the output signal of synchronizing pulse generators 1 and 2, and pulse generators 5 and 6, and sends the mixed signal to CRT so that electron beams are generated only in the preliminary and regular scanning periods. The electronic scanning is more suitable for this transmission system than the mechanical scanning. An image pickup tube or a flying spot scanner may be used as the electronic scanning and the embodiment using the latter is disclosed here. In FIG. 3, deflection of the photoelectric converting device 18 is performed electrostatically, but the deflection may be obtained electromagnetically, of course.

It is desirable to use a fluorescent material for the photoelectric converting device 18 which is short in its vestigial light time, and only the narrow space of the face of the photoelectric converting device is used. A flat cathode ray tube (CRT) is suitable for the disclosed system. It is effective to use an optical fiber to pass the light from the CRT to the document.

An electron multiplier is suitable for the photoelectric tube 20. It is preferable to provide two or more photoelectric tubes 20 so that they might catch the light coming from a long sideways piece of the picture. The picture must be transported during the line shifting period. This may be accomplished by a stepping gear which is rotated one tooth apiece by means of a plunger or a relay. A stepping motor or the like may also be used.

The image signal developed during preliminary scanning is used for the discrimination of useful information. In this case, the output signal of the photoelectric tube comes to the maximum value when the square is white or blank. On the other hand, the output signal is at a minimum value when the square is black. Consequently, the discrimination of useful information is easily accomplished by detecting a threshold value of the output signal using a Schmitt trigger circuit or the like. A level detector may be employed with the discriminator so as to divide the black signal into several grades.

Figure 4:
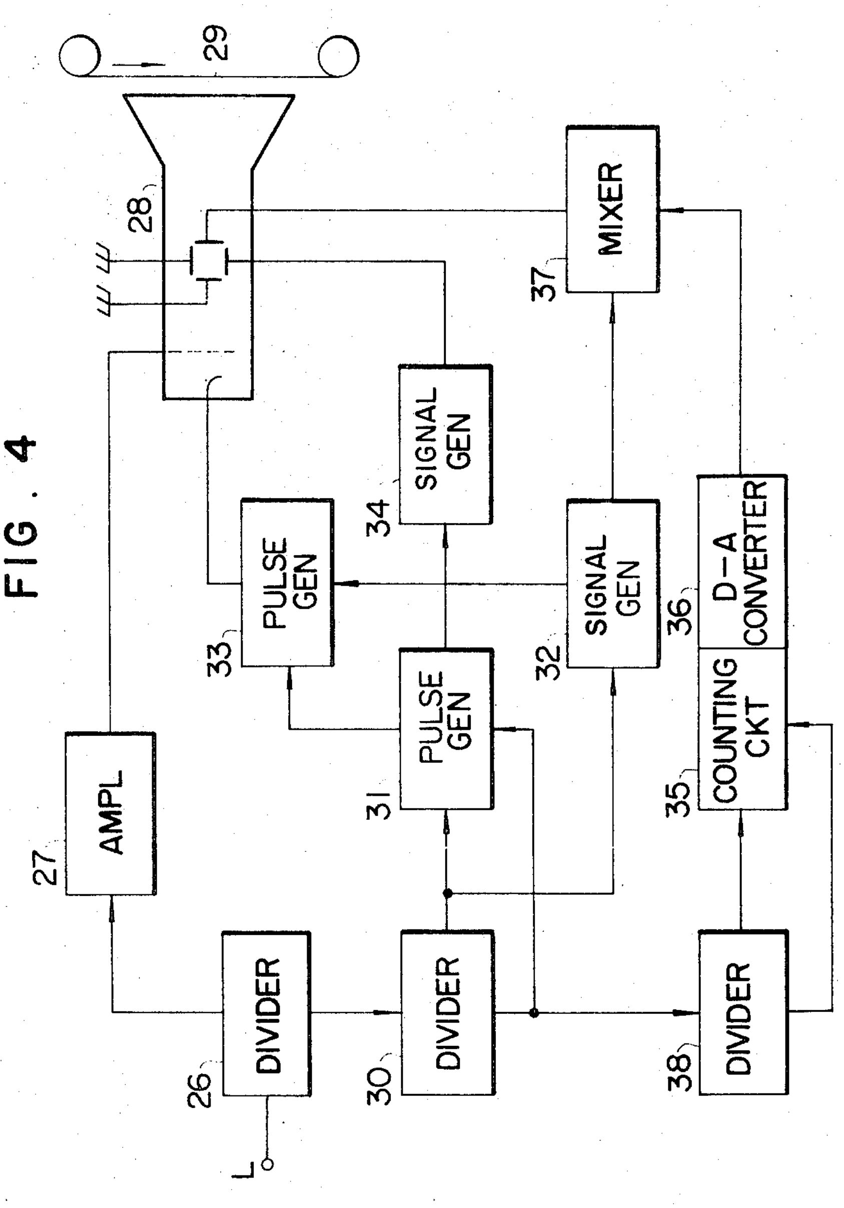
FIG. 4 is a circuit diagram of one embodiment of the receiver of the present invention.

FIG. 4 shows a circuit diagram of one embodiment of the receiver of the present invention. The signal being transmitted through a line is separated into the image signal and other pulse signals by a divider 26 which discriminates the polarity of the input signal. The image signal is fed into a photoelectric converting device 28 through an amplifier 27, and the electron beam of the device 28 is modulated by the image signal. A fluorescent material is brightened by the electron beam, and its light exposes a sensitive paper 29 in a square area whose position is equivalent to the minute square on paper 9 which originally contained the information presently modulating the electron beam. The remaining signal, wherein the image signal has been eliminated, is further divided by divider 30 into the small amplitude signal including a horizontal synchronizing pulse and the large amplitude signal including a combined signal of square and line shifting pulses, using an amplitude detecting method. A pulse generator for vertical scanning 31 starts its operation at the fall time of the first pulse of horizontal synchronizing pulses which are continuously generated by divider 30, and stops its operation at the rise time of the shifting pulse for square or line. A signal generator for a vertical scanning 34 is controlled by the pulse generator 31, thereby the electron beam of the photoelectric converting device 28 is vertically deflected to scan.

A signal generator for a horizontal scanning 32 is controlled by synchronizing pulses of the divider 30 and its output signal is fed into the photoelectric converting device 28 through a mixer 37, thereby horizontally deflecting the electron beam of the device 28 to scan.

Output signals of the divider 30 are further divided by a divider 38 into a shifting pulse for squares and a shifting pulse for lines using the difference of the pulse width. The shifting pulse for shifting the scanning operation from one square to the next square (the shifting pulse for squares) is fed into a counting circuit 35 whereby the shifting pulses are counted, and is simultaneously reduced into the step wave form by a D-A convertor 36 which is connected with the counting circuit 35. The step wave form signal is fed into the horizontal deflecting portion of the photoelectric converting device 28 through the mixer 37, thereby shifting the electron beam horizontally.

The shifting pulse for shifting the scanning operation from one line to the next line (the shifting pulse for lines) is sent out from the divider 38 and is fed into the counting circuit 35. After counting "k" with the shifting pulse for squares, the counting circuit 35 is reset to the starting point by the shifting pulse for lines, thereby returning the electron beam of CRT to the left end of the next line from the right end of the line.

A pulse generator for a blanking 33 is controlled by pulse generators for vertical and horizontal scanning 31 and 32, and the electron beam of the photoelectric converting device 28 is controlled so as to convert the image signal into the photo signal during the effective period. A flat photoelectric converting device is suitable for the photoelectric converting device 28 as only a narrow space of the device is used. A cathode ray tube having a thin window, a display device using a glass fiber and an electrostatic type memory tube are preferable to provide high sensitivity, excellent resolution, etc. In this embodiment, the electrostatic type scanning is adopted, but other types, e.g., an electrostatic or an electromagnetic type scanning, may also be used.

In the embodiment described, the transmitting signal is directly sent out to the line, but it may be used to modulate a carrier which is sent out to the line after modulation by the signal in amplitude or frequency. A part of said modulated signal may be omitted to ease the signal being transmitted by the line and to obtain good transmitting characteristics. It will be understood by those skilled in the art that these various changes may be made without departing from the spirit and scope of the invention.

According to the present invention, as described hereinbefore, a picture or a writing can be transmitted in a shorter period than in prior art transmission systems.

What is claimed is:

1. An electronic transmission system for transmitting documents comprising:

a. electronic scanning means adapted to scan a document in response to control signals applied thereto and develop an electronic image of the portion of the document scanned;

b. preliminary scan means for controlling said scanning means to execute a relatively rapid raster-type pattern scan of a minute square area of said document, said raster-type scan comprising a plurality of strokes in one dimension displaced from one another in a second dimension perpendicular to said one dimension;

c. discriminator means connected to said scanning means for detecting the presence or absence of useful information in the electronic image formed during said preliminary scan;

d. regular scan means connected to said discriminator means for controlling said scanning means to initiate a relatively slow raster-type pattern scan of said minute area only in response to said discriminator means detecting the presence of useful information in said minute area during said preliminary scan;

e. area shift pulse generating means for generating an area shift pulse when triggered;

f. first means responsive to the termination of a preliminary scan and the absence of useful information detected by said discriminator for triggering said area shift pulse generating means;

g. second means responsive to the termination of a regular scan for triggering said area shift pulse generating means;

h. shift means responsive to said area shift pulses for initiating said preliminary scan means and for shifting the preliminary scan to an adjacent new minute area;

i. line shift pulse generator means responsive to said area shift pulses for generating a line shift pulse, distinguishable from said area shift pulse, upon receiving a predetermined number of said area shift pulses; and j. means for transmitting said area and line shift pulses along with said electronic images developed only during regular scans.

2. An electronic transmission system as claimed in claim 1 further comprising a receiver for receiving said transmitted signals and reproducing an image of said document, said receiver comprising:

a. electronic image forming means of the type having a face and which produces an image forming spot, moveable over said face, which can be modulated with image signals to form an image;

b. first means responsive to said area shift pulses for moving said moveable spot an amount equivalent to one minute area along a single dimension and in a single direction of said face;

c. second means responsive to said line shift pulses for resetting said first means to thereby move said spot in a direction opposite said single direction back to an initial position; and d. means responsive to said image signals for modulating the intensity of said spot.

3. A system as claimed in claim 1 wherein said regular scan means comprises, a. vertical pulse generator means responsive to the end of a preliminary scan and the detection of useful information during said preliminary scan for generating a regular scan vertical control pulse, b. horizontal pulse generator means responsive to said regular scan vertical control pulses for generating regular scan horizontal control pulses of a predetermined number to control the horizontal synchronization of said electronic scanning means during said regular scan, and c. means for including said regular scan horizontal control pulses for transmission with said electronic images and said shift pulses.

* * * * *